US009285386B2

(12) United States Patent
Huynh et al.

(10) Patent No.: US 9,285,386 B2
(45) Date of Patent: Mar. 15, 2016

(54) INDUCTIVE ROTATIONAL SPEED SENSORS

(71) Applicant: Rosemount Aerospace Inc., Burnsville, MN (US)

(72) Inventors: Cuong T. Huynh, Shakopee, MN (US); Magdi A. Essawy, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 72 days.

(21) Appl. No.: 14/188,720

(22) Filed: Feb. 25, 2014

(65) Prior Publication Data
US 2015/0160254 A1    Jun. 11, 2015

Related U.S. Application Data

(60) Provisional application No. 61/912,709, filed on Dec. 6, 2013.

(51) Int. Cl.
| | | |
|---|---|---|
| G01P 3/48 | (2006.01) | |
| G01P 3/488 | (2006.01) | |
| G01D 5/20 | (2006.01) | |

(52) U.S. Cl.
CPC ........ *G01P 3/48* (2013.01); *G01D 5/204* (2013.01); *G01P 3/488* (2013.01)

(58) Field of Classification Search
CPC ............ G01D 5/204; G01P 3/48; G01P 3/488
USPC .............. 324/160–167, 173–174, 207.11–16, 324/207.25
See application file for complete search history.

(56) References Cited

U.S. PATENT DOCUMENTS

| 3,614,593 | A | | 10/1971 | Lace | |
|---|---|---|---|---|---|
| 4,195,262 | A | * | 3/1980 | King | G01R 29/0871 342/360 |
| 4,228,396 | A | * | 10/1980 | Palombo et al. | 324/163 |
| 4,305,153 | A | * | 12/1981 | King | G01R 29/0871 342/360 |
| 4,425,511 | A | | 1/1984 | Brosh | |

(Continued)

FOREIGN PATENT DOCUMENTS

| EP | 0198272 | A2 | | 10/1986 | |
|---|---|---|---|---|---|
| EP | 198272 | A2 | * | 10/1986 | ............ G01F 1/075 |
| EP | 2108963 | A2 | | 10/2009 | |

OTHER PUBLICATIONS

EP0198272(A2), Oct. 22, 1986 Patent Translate, "Transducer for transferring a mechanical input value into an electrical output value", G01F1/075.*

(Continued)

*Primary Examiner* — Melissa Koval
*Assistant Examiner* — Rahul Maini
(74) *Attorney, Agent, or Firm* — Locke Lord LLP; Scott D. Wofsy; Daniel J. Fiorello

(57) ABSTRACT

An inductive rotational speed sensor assembly includes a first PCB with a transmitter coil configured to convert an alternating electrical input into an alternating magnetic field. A second PCB is operatively connected to the first PCB for relative rotation and includes a resonance coil configured to couple to the alternating magnetic field of the first PCB to output a modulating position signal. The first PCB includes a receiver coil configured to receive the first and the modulating position signal and to output a signal indicative of rotational speed of the second PCB relative to the first PCB.

3 Claims, 2 Drawing Sheets

(56) References Cited

U.S. PATENT DOCUMENTS

| | | | |
|---|---|---|---|
| 5,177,432 A * | 1/1993 | Waterhouse et al. | 324/166 |
| 5,218,520 A | 6/1993 | Rozman et al. | |
| 5,483,156 A * | 1/1996 | Nishihara | G01P 1/00 |
| | | | 324/166 |
| 5,770,909 A | 6/1998 | Rosen et al. | |
| 6,043,644 A | 3/2000 | de Coulon et al. | |
| 6,304,076 B1 | 10/2001 | Madni et al. | |
| 6,336,070 B1 | 1/2002 | Lorenz et al. | |
| 6,420,842 B1 | 7/2002 | Gold | |
| 6,522,128 B1 | 2/2003 | Ely et al. | |
| 7,034,522 B2 * | 4/2006 | Gester | G01D 5/2053 |
| | | | 324/166 |
| 7,345,457 B2 | 3/2008 | Garces et al. | |
| 7,538,544 B2 | 5/2009 | Lee | |
| 7,808,215 B2 | 10/2010 | Markunas et al. | |
| 7,884,581 B2 | 2/2011 | Markunas et al. | |
| 8,056,417 B2 | 11/2011 | Markunas et al. | |
| 8,217,630 B2 | 7/2012 | Markunas et al. | |
| 8,248,064 B2 * | 8/2012 | Schunk | G01P 13/04 |
| | | | 324/166 |
| 2008/0164869 A1 | 7/2008 | Bach et al. | |
| 2011/0025349 A1 | 2/2011 | Howard et al. | |
| 2012/0313565 A1 | 12/2012 | Ortman et al. | |
| 2014/0028293 A1 * | 1/2014 | Johnson et al. | 324/167 |
| 2014/0035564 A1 * | 2/2014 | Lee et al. | 324/207.12 |
| 2014/0327432 A1 * | 11/2014 | Elliott et al. | 324/207.16 |

OTHER PUBLICATIONS

Davis, Roy I. et al., "Engine Torque Ripple Cancellation With an Integrated Starter Alternator in a Hybrid Electric Vehicle: Implementation and Control", IEEE Transactions on Industry Applications, vol. 39, No. 6, Nov./Dec. 2003, pp. 1765-1774.

Kurschner, Daniel et al., "Design Methodology for High Efficiency Inductive Power Transfer Systems With High Coil Positioning Flexibility", IEEE Transactions on Industrial Electronics, vol. 60, No. 1, Jan. 2013, pp. 372-381.

Extended European Search Report and Opinion issued by the European Patent Office on Apr. 22, 2015 for European Patent Application No. 14196830.

* cited by examiner

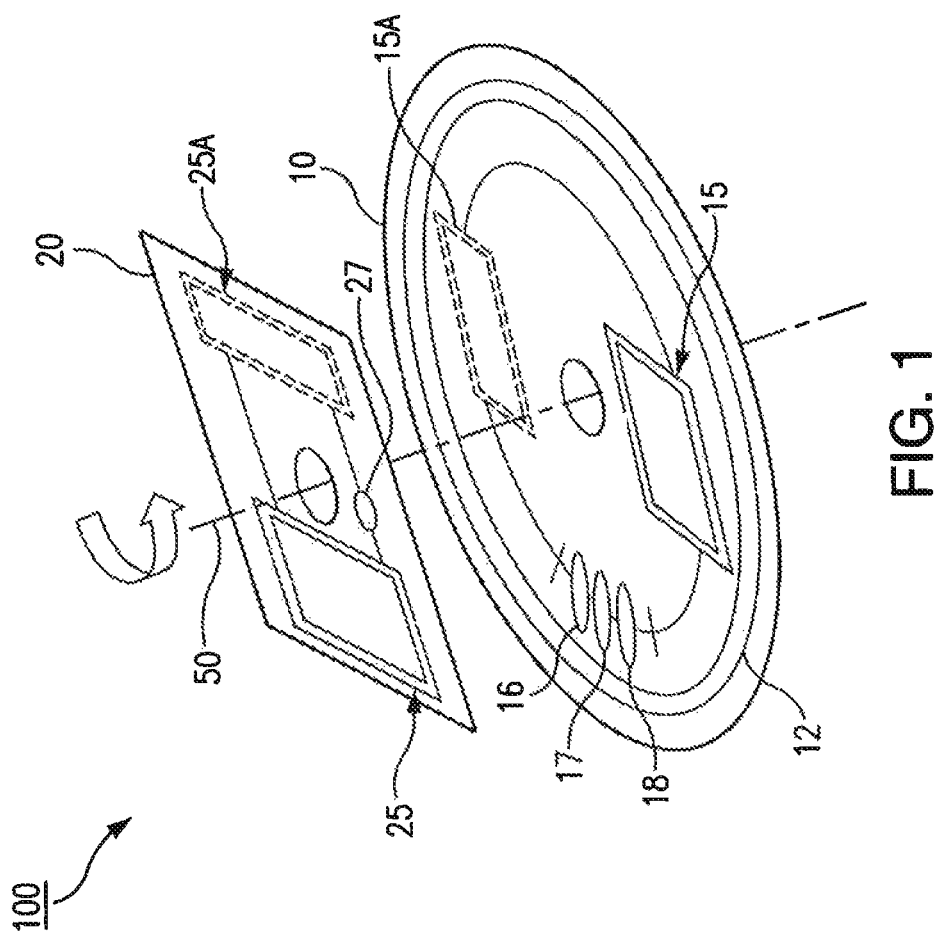

INDUCTIVE ROTATIONAL SPEED SENSORS

CROSS-REFERENCE TO RELATED APPLICATIONS

This application claims priority to U.S. Provisional Patent Application No. 61/912,709 filed Dec. 6, 2013, which is incorporated by reference herein in its entirety.

BACKGROUND OF THE INVENTION

1. Field of the Invention

The present disclosure relates to sensors, and more particularly to inductive contactless sensors for measuring rotational speed.

2. Description of Related Art

Induction-based sensor technology uses sensing coils that are made of copper traces printed on electronic printed circuit board. This type of sensor is capable of measuring the relative position between a sensing printed circuit and a position target without being in physical contact with it. This technology is outlined for various applications in U.S. Pat. Nos. 6,534,970 and 8,129,985, each of which is incorporated by reference in its entirety. This type of technology has been widely used for position sensing, but has not been often used to measure speed of a target.

Various sensor assemblies for measuring the rotational speed of an object are known in the art. In many conventional applications, the sensor system is either positioned in contact with the object to be measured, or is a non-contact system, e.g., with electromagnetic wound coils, magnet systems, or optical solutions. These systems have many disadvantages, including being expensive, bulky, heavy, or sensitive to noise introduced in harsh operating environments such as those having mechanical vibrations and variable temperatures. These systems are also subject to other sources of error including noise and signal interference associated with mounting analog signals around other sources of electromagnetic interference.

Such conventional methods and systems have generally been considered satisfactory for their intended purpose. However, there is a need in the art for implementing less expensive, smaller sized, and lighter weight devices with higher accuracy and better linearity for measuring rotational speed and communicating the output in a more robust digital signal that is more resistant to noise and electromagnetic interference. There is also a need to use less complex means to adopt advanced networking and wireless communication systems. The present disclosure provides a solution for such implementation.

SUMMARY OF THE INVENTION

An inductive rotational speed sensor assembly includes, inter alia, a first printed circuit board (PCB) including a transmitter coil and a receiver coil separate from the transmitter coil. The transmitter coil is configured to convert a high frequency alternating electrical input (e.g., in the multiple mega-cycles per second range) into an electromagnetic signal, e.g., an alternating magnetic field. A second PCB is operatively connected to (e.g., electromagnetically coupled to) the first PCB. In particular, the second PCB couples the electromagnetic signal coming from the transmitter coil of the first PCB with the receiver coil of the first PCB through a resonant circuit coil in series with a matching capacitor. The coupling factor between transmitter and receiver coils through the resonant circuit coil of the target second PCB in between varies with position, creating a signal in the receiver coil that is modulated with target position. This position modulated receive signal will have peaks and valleys alternating with target physical rotation. The frequency of change of these peaks and valleys is an indication of a target rotational speed.

In certain embodiments, the resonance and/or the receiver coils are non-axisymmetric relative to an axis of rotation defined by relative rotation of the first PCB and the second PCB. The receiver coil of the first PCB can include additional receiver windings to detect a rotational speed with increased precision and the receiver windings can be designed with increased number of poles to be able to measure rotation at much lower speeds. Similarly, the second PCB (target) can include at least one loop or variations of additional coil loops for increased sensing precision at lower rotational speeds. By increasing the windings or coil loops, target circuit resonance is introduced to further increase coupling and create a more robust receive signal at those frequencies.

In accordance with certain embodiments, the transmitter coil is positioned along an outer perimeter of the first PCB. The transmitter coil can also be positioned at an interior portion of the first PCB, as long as the location will provide the needed coupling with the resonant circuit coil. The first PCB can include a sequence of filters, signal amplifiers, and pulse counting circuit that are operatively connected to the receiver coil. This pulse count is directly proportional to the target rotational speed and can be translated with little calibration to speed indicating output.

A method of converting an electrical signal to a rotational speed includes first converting an alternating electrical input to an alternating magnetic field with a transmitter winding of a first PCB; receiving the alternating magnetic field with a resonance winding of a second PCB rotating relative to the first PCB; emitting a modulating position signal with the resonance winding of the second PCB; receiving the modulating position signal with a receiver winding of the first PCB; and outputting a signal indicative of rotational speed from the first PCB.

The method can include calculating the rotational speed from consecutive peaks created by constructive interference in the outputted signal. The rotational speed can be calculated using the time between consecutive peaks of the outputted signal. The method can also include converting the outputted signal to an angular speed using the equation $\omega=360°/nT$, where $\omega$ is the angular speed in degrees per second, n is the number of receiver pairs of magnetic poles in the receiver coil on the first PCB, and T is the period of the output signal.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a schematic perspective view of an exemplary embodiment of an inductive rotational speed sensor assembly in accordance with the present disclosure; FIG. 2A shows raw electrical signal output, FIG. 2B shows demodulated and rectified electrical output, FIG. 2C shows filtered electrical output, and FIG. 2D shows the amplified electrical output.

DETAILED DESCRIPTION OF THE PREFERRED EMBODIMENTS

Figure 2A:
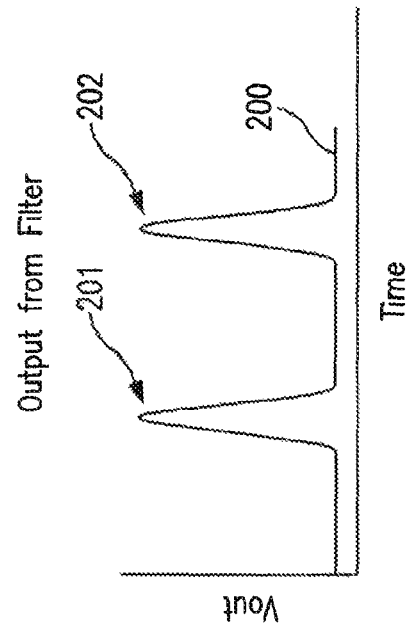
FIGS. 2A-D are a graphical illustrations of exemplary output electrical signals for use in determining rotational speeds where

Reference will now be made to the drawings wherein like reference numerals identify similar structural features or aspects of the subject disclosure. For purposes of explanation and illustration, and not limitation, a partial view of an exemplary embodiment of the sensor assembly in accordance with the disclosure is shown in FIG. 1 and is designated generally by reference character 100. The systems and methods described herein can be used to provide a contactless rotational speed sensor using induction coupling and sensing.

Induction based rotational speed sensing in accordance with the disclosure can use electromagnetic coils made out of copper traces on a Printed Circuit Board (PCB). This sensor includes two adjacent PCBs separated by a nominally designed distance. The first PCB holds a high frequency electromagnetic field generator coil called the excitation or transmitter coil in addition to the sensing winding, also referred to as the receiver coil. The second PCB holds a resonator coil, also referred to as the target. The transmitter coil is energized with a high frequency alternating current input signal. This signal electromagnetically couples to the resonant target coil which in turn couples back to the receiver coil depending on the coil-to-coil alignment, which is a function of the angle between the imaginary central axes of the resonant target and receiver windings. As a result, when the target on the second PCB rotates relative to the first PCB, the receiver coil will receive a signal which amplitude is modulated by the target and receiver coil alignment to misalignment variation sequence as the target rotates on around its full axes. A series of signal pulses separated by a time period that is inversely proportional to the angular speed of the target is consequently generated in the receive coil signal. A circuit including one or more of a power supply, excitation signal generator, carrier demodulation circuit, a filter/amplifier combination, a comparator, and a high frequency clock counter can be used to detect the frequency of the consecutive electric pulses to determine the angular speed of the target.

FIG. 1 schematically illustrates an example of an inductive rotational speed sensor assembly 100. A first PCB 10 includes a transmitter winding 12 configured to convert an alternating electrical input into an alternating magnetic field and a receiver winding 15 separate from the transmitter winding 12. A second PCB 20 is electromagnetically coupled to the first PCB 10 for relative rotation measurement. The second PCB 20 includes resonant coil windings 25 connected in series with matching capacitor 27 to achieve resonance to the coupled signal. The resonant target coil 25 is configured to couple the signal generated in the transmitter coil 12 back to the receiver coil 15 with additional signal modulation that captures the alignment and misalignment resonant target coil 25 locations as it rotates around its axes 50. The receiver winding 15 on the first PCB 10 is configured to enhance, e.g., maximize, a signal through the coupling target along with the rotation induced modulation of the resonant target coil 25, and to reduce, e.g., minimize, the direct signal coming directly from the transmitter to the receiver coils due to their close proximity. The amplitude variation in the receive signal is indicative of the target PCB 20 rotational speed in relation to the first PCB 10. This speed is measured by counting the number of pulses per second in the received signal.

As shown in FIG. 1, the resonant target coil 25 and the receiver coil 15 are each non-axisymmetric relative to the axis of rotation 50 defined by relative rotation of the first PCB 10 and the second PCB 20. The receiver coil of the first PCB 10 can optionally include one or more additional receiver coils 15A, indicated in FIG. 1 with broken lines, to add more electromagnetic poles and consequently detect lower rotational speeds with increased precision, e.g. in applications where angular position/speed needs to be measured for motion less than 360° around axis of rotation 50. The receiver coils 15, 15A can be spaced apart from one another and distributed evenly along the first PCB 10 to introduce additional electromagnetic poles. Similarly, the second PCB 20 can optionally include at least one additional resonance coil 25A, indicated in FIG. 1 with broken lines, to detect rotational speeds with increased precision at lower speeds. The resonance coils 25, 25A can be spaced apart from one another and distributed evenly along the second PCB 20.

The transmitter coil 12 is positioned along an outer perimeter of the first PCB 10 but can also be placed in an interior portion as long as the location will provide the needed coupling with the resonant target coil 25. The first PCB 10 also includes a sequence of filters 16, signal amplifiers 17, and pulse counting circuit 18, which are operatively connected to the receiver windings 15, 15A for determining rotation speeds based on the signals from 15, 15A. The second PCB 20 also includes a capacitor 27 connected in series therewith for created a resonator. The resonator circuit provides a stronger signal in the resonant target coil 25 for better coupling to the receiver coil 15, enhanced output signal, and better signal to noise ratio.

A method of converting an electrical signal to a rotational speed is provided in the present disclosure using the sensor assembly of FIG. 1. The method includes first converting an alternating electrical input to an alternating magnetic field using the transmitter coil 12 of the first PCB 10. The method includes receiving the alternating magnetic field with the resonance coil 25 of the second PCB 20 rotating relative to the first PCB 10 and emitting a modulating position signal from the resonance coil 25 of the second PCB 20. The method also includes receiving the modulating position signal with the receiver coil 15 of the first PCB 10 and outputting a signal indicative of rotational speed from the first PCB 10 based on the modulating position signal.

Figure 2B:
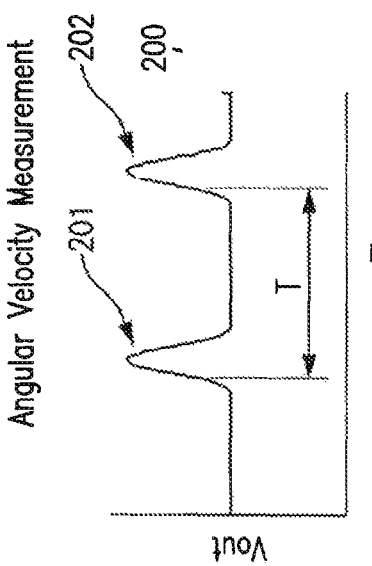
Figure 2C:
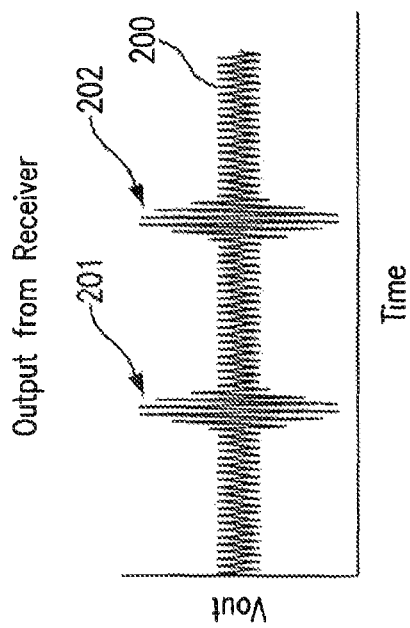
Figure 2D:
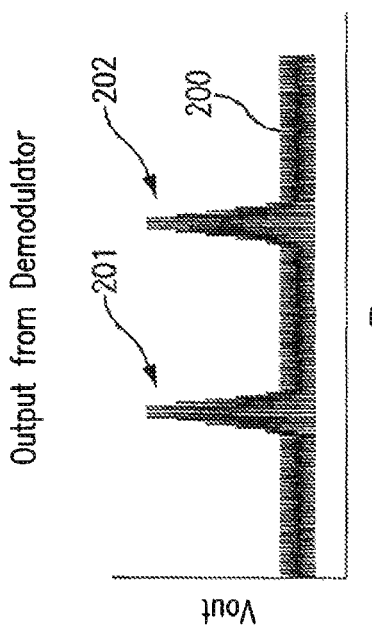

FIGS. 2A-D graphically illustrate the signal 200 from the electrical output indicative of rotational speed from the receiver winding 15 of the first PCB 10. The rotational speed of the resonance winding 25 of the second PCB 20 calculated from consecutive peaks 201, 202 created by constructive interference in the output electrical signal 200. The output electrical signal is the result of the amplitude modulated output signal of the original carrier frequency generated by the transmitter coil and received by the receiver coil indirectly through coupling with the resonant target coil which modulates the signal with target position and amplifies it through electrical circuit resonance. This component of the received signal is enhanced, e.g., maximized, in the design, while the direct component coming from the transmitter coil to the receiver coil is reduced, e.g., minimized, as much as practically possible; otherwise it is further excluded through the following signal demodulation, filtering and signal processing steps. More specifically, the rotational speed can be calculated by the time between consecutive peaks 201, 202 of the outputted electrical signal 200.

The equation $\omega=360°/nT$ can be used to calculate an angular speed, where $\omega$ is the angular speed in degrees per second, n is the number of receiver windings pair of poles on the first PCB 10, and T is the period of the output signal 200. The accuracy of the calculated rotational speed can be improved by demodulating, filtering, and amplifying the raw electrical signal, shown in FIG. 2A to create the demodulated signal shown in FIG. 2B. The accuracy of the calculated rotational speed is also improved by further filtering and smoothing the demodulated electrical signal to create the filtered signal shown in FIG. 2C and/or by amplifying the signal into the amplified signal shown in FIG. 2D.

The methods and systems of the present disclosure, as described above and shown in the drawings, provide for a sensor assembly that uses inductive based coils printed on electronic PCBs to effectively measure rotational speed, thereby providing performance, cost, size, weight, power, and reliability advantages over traditional sensors. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method of converting an electrical signal to a rotational speed comprising:

converting an alternating electrical input to an alternating magnetic field using a transmitter coil of a first PCB;

receiving the alternating magnetic field with a resonance coil of a second PCB rotating relative to the first PCB;

emitting a modulating position signal from the resonance coil of the second PCB;

receiving the modulating position signal with a receiver coil of the first PCB;

outputting a signal indicative of rotational speed from the first PCB; and converting the output signal to an angular frequency $\Omega=360°/nT$, where $\Omega$ is an angular speed in degrees per second, n is a number of receiver coil pole pairs on the first PCB, and T is a period of the outputted signal.

2. A method as recited in claim 1, further comprising calculating the rotational speed from consecutive peaks created by constructive interference in the output signal.

3. A method as recited in claim 2, wherein the rotational speed is calculated using the time between consecutive peaks of the output signal.

* * * * *